May 17, 1932.  J. E. BURKS  1,858,803
COVER FOR UNDER FLOOR PIPING
Filed Aug. 18, 1928   2 Sheets-Sheet 1
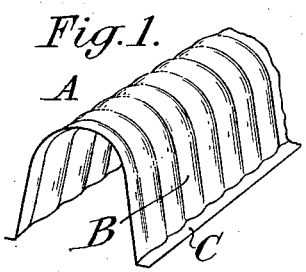
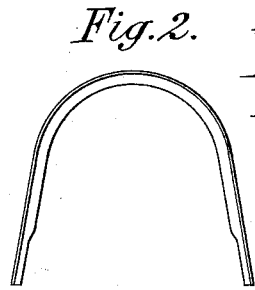
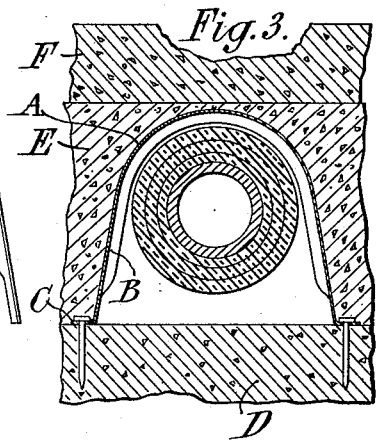
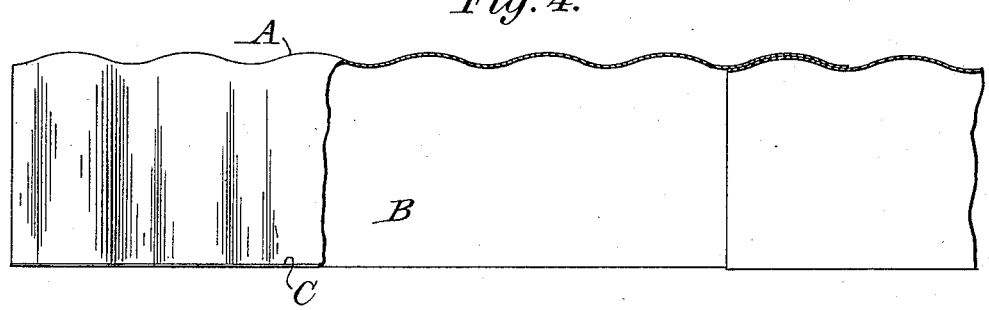
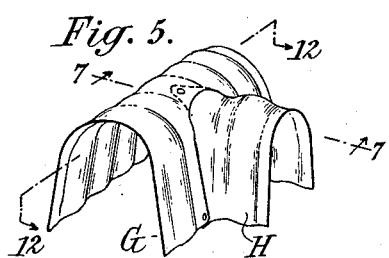
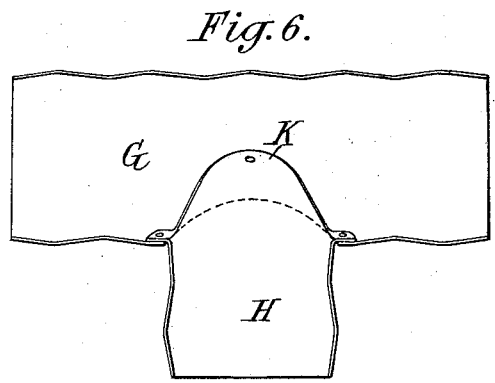
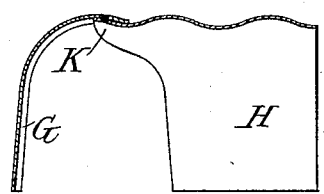
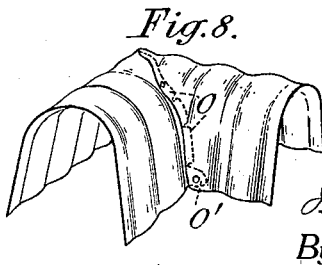
INVENTOR
John E. Burks,
By Attorneys, May 17, 1932.  J. E. BURKS  1,858,803
COVER FOR UNDER FLOOR PIPING
Filed Aug. 18, 1928   2 Sheets-Sheet 2

INVENTOR :
John E. Burks,
By Attorneys,
Fraser, Myers & Manley

Patented May 17, 1932

1,858,803

UNITED STATES PATENT OFFICE

JOHN E. BURKS, OF BROOKLYN, NEW YORK, ASSIGNOR TO CHARLES HARTMANN COMPANY, OF BROOKLYN, NEW YORK, A CORPORATION OF NEW YORK

COVER FOR UNDER FLOOR PIPING

Application filed August 18, 1928. Serial No. 300,450.

This invention relates to covers for underfloor piping and aims to provide certain improvements therein.

In buildings of modern construction the floors are usually made of concrete which is customarily formed in several layers, and through the concrete mass a considerable part of the piping is laid. Such piping forms the conduits for water, air, and freezing liquids, but principally for steam being conveyed from the riser to the radiators for heating purposes. Such risers or mains are customarily located in columns or in side walls from which the branches lead to the radiator stations or other fixtures or machines which are being supplied. Since the piping is usually embedded in the concrete structure of the floor or the floor fill which constitutes a part of the total floor thickness, the pipes must be protected from the fill and the concrete, and an air space allowed around the pipes for expansion, and, in most cases, insulation.

The customary method of protecting such piping is by the use of sheet metal strips bent to substantially the shape of an inverted U. In constructing the floor the main supporting layer of the latter is usually a slab of good grade of reinforced concrete sufficient to sustain the greater part of the floor load, and when this is in place the piping is usually introduced with the sheet metal covering, whereupon a poorer grade of concrete, such as cinder concrete is laid over the piping, and a thinner layer of concrete of good grade is superimposed upon the cinder. The finishing layers depend upon the character of floor which is to be constructed.

In the sheet metal cover as heretofore manufactured the sheet metal is required to be made of considerable thickness due to the fact that it must not be seriously indented in transportation and unloading, but principally on account of the fact that in the subsequent operations after the installation of the covering they are very apt to be stepped upon by the workmen, or otherwise subjected to strain or pressure, both during the construction of the remaining part of the floor, and also in sustaining floor loads after the flooring is finished.

According to the present invention I provide a novel form of pipe covering for this and other analogous purposes which is much less expensive to manufacture; and which presents certain other advantages over those heretofore used.

To this end I provide a construction of covering which in effect provides a series of connected arches which are hollow on their inner sides and convex on their outer faces. Broadly speaking, the metal as thus formed may be said to be corrugated, but in the preferred construction if the hollow arched form be regarded as corrugations formed in the metal, such corrugations are of excessive width as compared with the corrugations which are usually formed in sheet metal structures of the small dimensions under construction. The invention includes certain other features of improvement which will be hereinafter more fully described.

Referring to the drawings which illustrate the preferred form of the invention:

Figure 1 is a perspective view of a straight length of pipe covering.

Fig. 2 is an end view showing a slight modification of the foot or lower edges of the covering.

Fig. 3 is a cross-section of a concrete floor together with a steam pipe and covering.

Fig. 4 is a view partly in straight elevation and partly in longitudinal section showing the connection of several straight lengths of covering.

Fig. 5 is a perspective of a T-shaped section.

Fig. 6 is an underside view of Fig. 5.

Fig. 7 is a sectional view of Fig. 5 taken on the line 7—7.

Fig. 8 is a perspective view of an L-shaped section.

Fig. 10 is a plan view of the blank from which Fig. 9 is developed.

Figure 9:
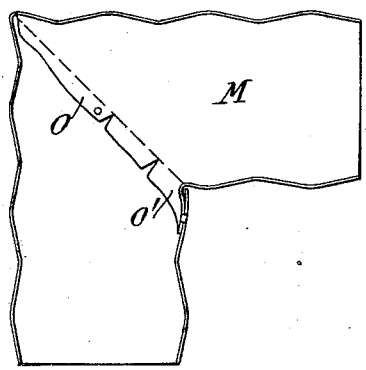
Fig. 9 is an underside view of Fig. 8.

Referring first to Figures 1 to 4 it will be seen that the covering in its simplest form comprises a sheet metal structure of general U-shaped cross-section, the metal being, broadly speaking, corrugated, with the corrugations running cross-wise of the cover. More specifically, however, it will be noted that the convolutions are relatively of great width as compared with the usual type of corrugations employed in metallic forms of similar dimensions. In the preferred form I have found the best results are obtained by making the corrugations approximately two inches in width in a covering which is approximately three and three-quarters inches in height and approximately the same width. There is thus provided a series of connected arches which on their interior faces are concave, and on their exterior faces convex. By so proportioning the corrugations I am enabled to produce an exceedingly strong covering which will sustain great weight without bending or deflecting under the conditions of transportation, erection, and use. The construction also resists effectively blows from any direction. In Figure 1 wherein the structure is indicated as a whole by the letter A and the arches by B, I have shown a foot flange C upon which the covering rests, the flanges being preferably straight and not bent.

The necessity for producing as resistant a structure as possible for a given weight of metal and expense of manufacture will be evident from a description of Fig. 3 which shows a customary method of using the device. In this figure D represents the lowermost concrete layer of a modern floor which extends between the I beams of the floor frame, and which is customarily reinforced by steel rods or strips which are not shown. The layer D which is designed to carry the major part of the floor load is usually formed of a high grade of concrete. It is not necessary that the whole floor thickness shall be of this same grade, and it is customary to fill in a large portion of the space between the top and bottom of the floor with a filler E. This may be formed mainly of cinders or other cheap material. The upper section of the floor indicated at F may be of a good grade of concrete, or may be variously constructed depending upon the type of floor used. In constructing the floor the usual underneath support is put in place, and the concrete D with its reinforces applied. The various horizontal pipings of the building are laid over this concrete; customarily they are elevated somewhat from the top of the concrete layer by spacing blocks. In Fig. 3 a steam piping is used provided with a heavy insulation, and the cover A is then applied, and if desired nailed to the concrete, as shown, through the flanges C. The space within the cover constitutes a dead air space which is required for insulation purposes. When the piping has been laid and the insulated covering applied, and the metal covers put in place, the cinder fill E is next applied. Frequently, however, the metal covers are exposed for some considerable time before the fill is applied. During this time of exposure they are frequently walked on by the workmen and subjected to other shocks and strains. They also bear a part of the load of the fill and the overlying surface layer of the floor. In addition to this, when the floor is applied heavy floor loads tend to cause the collapse of the covering, and to, hence, place unexpected and unintended loads upon the piping systems. These various strains and loads are adequately borne by the structure of the present invention when constructed of substantially half the thickness of metal formerly required.

A further feature of the invention lies in the capacity of the several sections for locking themselves together during and after application, so that the various sections of the entire system are connected together and resist any dislodgement. This is illustrated in Fig. 4, wherein three straight sections are shown which are overlapped at their ends to the extent of one corrugation.

Figure 11:
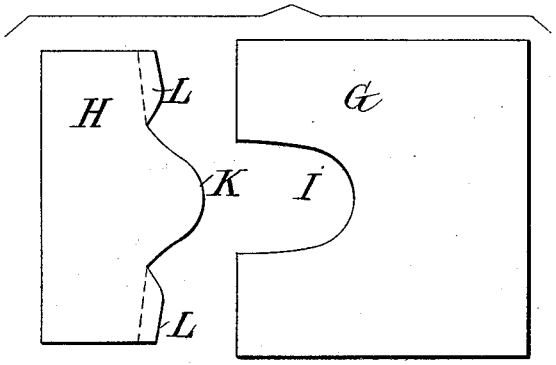
Fig. 11 is a plan view of a blank from which a T-shaped section is developed.
Figure 12:
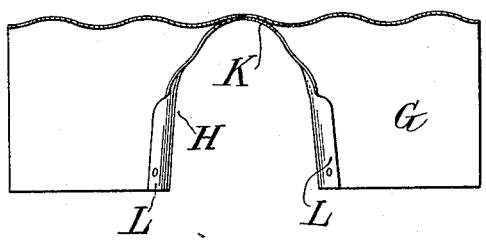
Fig. 12 is a view of such a section taken at right angles to Fig. 6.

In Figs. 5 to 7, and 11 and 12 I have shown the invention as applied to covering section in the shape of a T. The two blanks preferably utilized for this section are shown in Fig. 11 at G and H. The blank G may be substantially square and is formed with a recess I which when the blank is folded to U form appears at the side of the section. The blank H is provided with a corresponding tongue K, and is also formed with lugs L, L'. Both the tongue and the lugs are designed to overlap the section G on the interior thereof, the lugs being bent into the plane of the section G. The parts are preferably spot welded or riveted through the lugs and tongue. Fig. 5 shows a perspective view of the finished section, and Figs. 6 and 7 respectively an underside view and a sectional view on the line 7—7 in Fig. 5.

Figure 10:
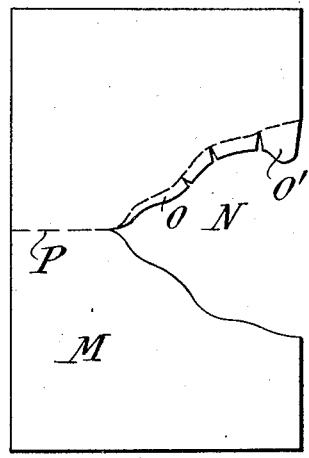

The L-shaped sections are formed as shown in Figs. 8, 9, and 10. Fig. 10 shows the blank M which is provided with a cut-away portion or recess N on one side of which are left several lugs O, O', etc., which when the blank is bent at an angle on the line P, and the legs formed in U-shape, will overlap the opposite part of the wall of the recess, and may be spot welded, riveted, or otherwise connected therewith. A perspective view of the L-shaped cover is shown in Fig. 8, and an underside view in Fig. 9.

In constructing the T-shaped cover the recess I is best so related to the corrugations that its center line will pass through the middle of the convex part of one of the corrugations, and in the case of the elbow cover the bend P is best made through the same part of one of the corrugations.

In either instance the T and L-shaped sections have their legs of sufficient length to permit of overlapping the adjacent or connected sections to the extent of at least one complete corrugation.

Figure 13:
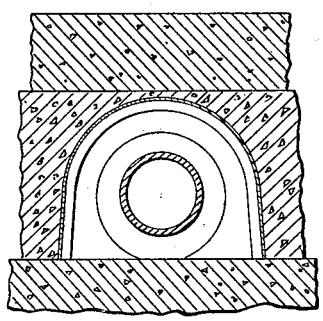
Fig. 13 is a sectional view of a concrete flooring showing the use of a construction such as is illustrated in Fig. 2 in cross-section.

In the modified form shown in Figs. 2 and 13 the flanges C are omitted, and the covering permitted to rest upon the cement without being fastened thereto.

By the use of the straight sections and the T and L sections practically any system of piping can be covered, or, if it is necessary to protect oblique connections these can be easily made according to one or the other of the two methods described modified slightly to suit the angular relation of the pipes.

It will be seen that the invention provides a superior covering of the type described, with the use of metal of much lighter gauge than those heretofore used; also that the covering may be applied with greater facility and will maintain its position fixed after application so that it is not liable to move out of position during subsequent operations in completing the floor.

While I have shown and described several forms of the invention, it will be understood that I do not wish to be limited thereto, since various changes may be made therein without departing from the spirit of the invention.

What I claim is:

1. A cover for underfloor piping or the like, comprising a T-shaped member, each of the legs thereof being of inverted U-shape in cross-section and formed with transverse corrugations, the cross-head of the T member being formed with an inverted U-shaped opening in one side, the upright of the T member being formed with lugs at its cross-head connecting end, and the said members being connected together by the lugs on the upright member engaging within the opening and overlapping the wall of said cross-head member.

2. A cover for under-floor piping or the like comprising a series of straight and angled sections, each of which is formed with corrugations extending transversely of its length, the sections being connected at each joint by one section overlapping the next section to an extent equal to at least one corrugation, whereby the series are locked together against displacement in an end-wise direction independent of supplemental securing means.

3. A cover for underfloor piping or the like, comprising an L-shaped member formed of a single blank of sheet metal which is provided with a cutaway portion or recess in one side thereof, each of the legs of said member being bent into substantially inverted U-shape in cross-section and integrally connected together at the apex of the member whereat said blank is bent at a right-angle along the line which substantially bisects the recess, the edges of the recess having cooperating, overlapping portions when the blank is bent into L-shape, and said overlapping portions being connected together.

4. A cover for underfloor piping or the like, comprising an L-shaped member formed from a single sheet metal blank having corrugations extending transversely thereof, and being provided with a cutaway portion or recess in one side thereof, said blank being bent at a right-angle along the line which substantially bisects the recess, and each of the elements thus formed being bent into substantially inverted U-shaped cross-section to provide the legs of the member and bring the edges of the recess together, one of said edges being formed with lugs which are caused to overlap the opposite edge of the cutaway portion when the blank is bent as aforesaid, and said overlapping portions being connected together.

In witness whereof, I have hereunto signed my name.

JOHN E. BURKS.